UNITED STATES PATENT OFFICE.

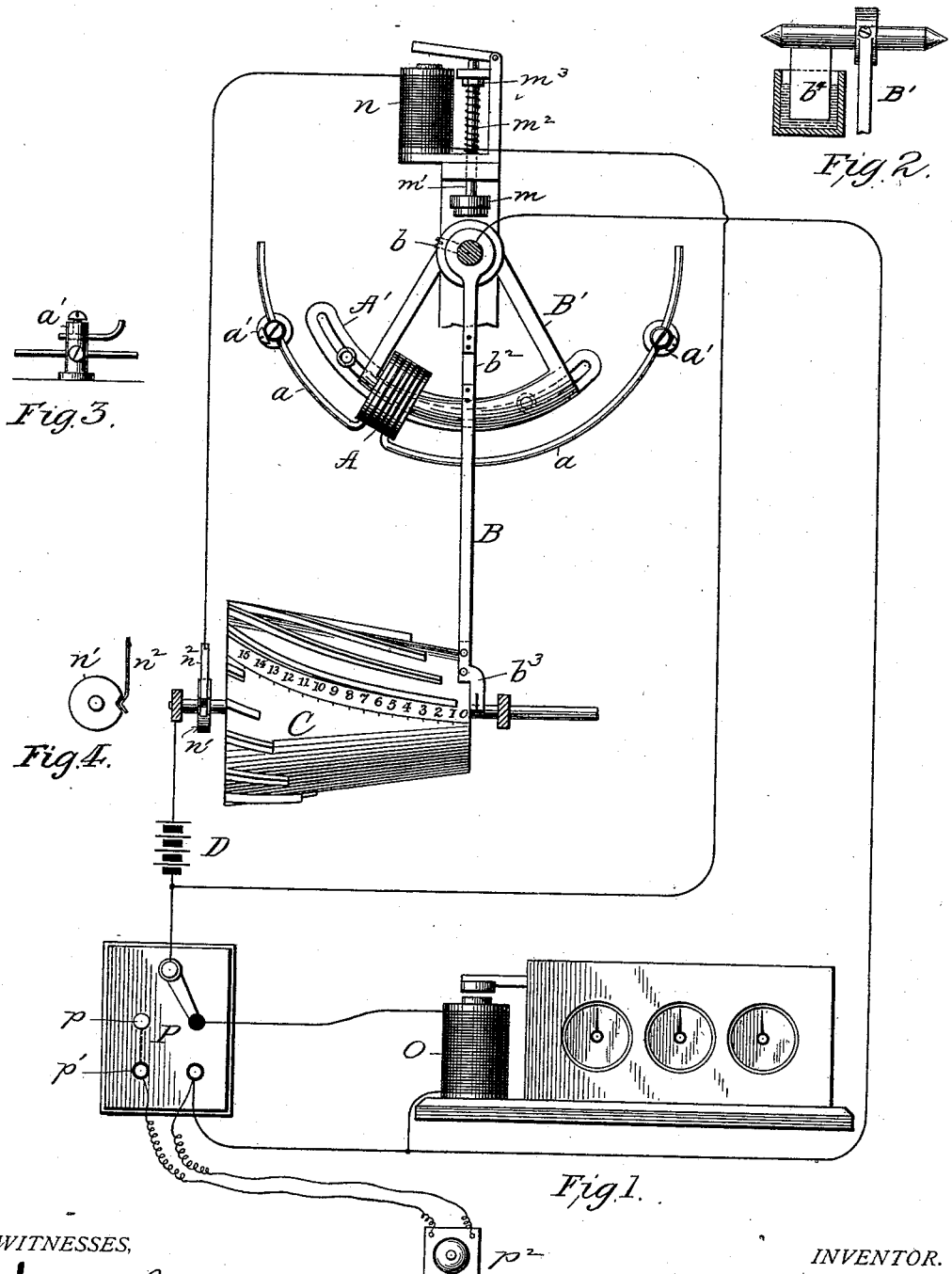

EDWARD R. KNOWLES, OF BROOKLYN, NEW YORK, ASSIGNOR, BY MESNE ASSIGNMENTS, TO THE MUTUAL ELECTRIC MANUFACTURING COMPANY, OF NEW YORK.

ELECTRIC METER.

SPECIFICATION forming part of Letters Patent No. 408,017, dated July 30, 1889.

Application filed February 14, 1889. Serial No. 299,844. (No model.)

*To all whom it may concern:*

Be it known that I, EDWARD R. KNOWLES, a citizen of the United States, residing in Brooklyn, in the county of Kings and State of New York, have invented certain new and useful Improvements in Electric Meters, of which the following is a full, clear, and exact description.

My invention relates to improvements upon the meter described in my application, Serial No. 289,414, filed October 29, 1888; and it consists in certain details which render meters of this class more efficient in operation, and also provides certain details which render the manipulation of the meter by an operator a simple and easy task.

Among other things the invention embraces a testing apparatus for the purpose of determining at any time whether the meter is in working condition.

Referring to the drawings, Figure 1 represents a diagrammatical view of the principal elements of the meter, together with the circuits. Fig. 2 is a detail view of a cushion or dampening device to prevent sudden motion or movement of the meter. Fig. 3 is a detail of the main binding-posts; and Fig. 4, a detail of a circuit-closing wheel, which will be hereinafter described.

Referring to the drawings by letter, A represents the main solenoid, through which the current to be measured passes. I have improved the manner of mounting and connecting the terminals of this solenoid with the main line. When the solenoid, as is usually the case, is wound with heavy and stiff wire and the same wire runs off to binding-posts, it is practically impossible to move the solenoid bodily, because the stiffness of the terminal wires prevent such movement. I mount the solenoid upon a sliding bracket A', and form the stiff wire terminals into arcs of circles $a\ a$, and pass the said terminals through binding-posts $a'$, wherein they are secured by screws. By this means the solenoid may be adjusted with respect to its core by simply loosening the screws holding the arc-shaped conductors in the binding-posts and the screws in the bracket A' and sliding the whole structure in the proper direction. These arc-shaped conductors may be formed from the same piece of wire constituting the winding of the solenoid, or they may be separate pieces soldered or otherwise attached to the terminals of the solenoid.

Another means of adjustment lies in connecting the triangular frame B', supporting the solenoid-core, with the shaft by means of a tightening-screw $b$, and a still further means of adjustment lies in the securing of the arm B to the same shaft by a tightening-screw. By means of these three adjustable parts the greatest nicety in the adjustment of the moving elements may be secured. These means of adjustment are provided particularly to allow of the meter being transported or moved about at pleasure, and then be accurately adjusted in its new position. As a rule it is necessary to exercise considerable care in the handling of meters, and it is this special care that I desire to do away with.

To make the friction of the arm B as light as possible, I have inserted into said arm a spring $b^2$. The contact-point at the extremity of the arm will preferably be a platinum spring $b^3$, removably secured to the end of the arm for the purpose of renewing it at any time desired.

In order to prevent sudden movements of the arm B, I attach to the shaft controlling it a wing $b^4$. (Shown in Fig. 2.) This projects downward into a vessel of mercury or other heavy liquid, the weight of which acts to cushion or dampen sudden movements of the arm.

In the application above mentioned I have described mechanism for preventing backward movement of the arm B when it is struck by the inclined flanges on the drum C. In this application I have described another and more simple means for accomplishing the same thing. This consists of a brake-shoe $m$, adapted to bear upon the hub of the triangular frame B', carrying the solenoid-core. This shoe is fixed upon the end of a rod $m'$, passing up through the frame, and is normally held out of contact with the hub of the shaft by a spring $m^2$, whose tension may be adjusted by the set-nut $m^3$. The rod projects through its bearing in the frame and supports the armature of an electro-magnet $n$. The circuit of this magnet is from battery D, through the shaft of the drum, to a metallic wheel $n'$, thence to contact-spring $n^2$, through the magnet, and back to battery. The contact-spring $n^2$ normally rests in a notch in the wheel $n'$ and out of contact therewith; but upon the starting of the drum contact is immediately made and maintained during the revolution of the drum. The circuit thus completed through the magnet, the armature of the same is drawn downward, thrusting the brake-shoe against the hub and preventing movement of the shaft.

I have devised means for testing the meter to determine whether it is in working condition at any time or not. This consists of the switch and switch-board P. In the normal and operative condition of the meter the switch is in the position shown. Thus the circuit is as follows: from positive side of battery, through the drum, to the arm B, through the register-magnet O, across the switch to negative side of battery. If it is desired to test the circuits of the meter, the switch may be thrown over onto contact $p$, which is connected with the metallic plug-hole $p'$. The register-magnet is then left out of the circuit, and a tinkler-bell $p^2$ is thrown into the same. If the circuits are all right, the bell will ring; otherwise it will not. The terminals of the bell may be made removable by the use of plugs inserted into metallic sockets in the switch-board.

Having described my invention, I claim—

1. In an electric meter, the terminals of the main solenoid formed of rigid metal and bent so as to form arc-shaped strips, in combination with binding-posts which adjustably support said strips, and also form the terminals of the circuit carrying the current to be measured, substantially as described.

2. In an electric meter, the main solenoid mounted upon an adjustable bracket, in combination with the arc-shaped terminals and the binding-posts in which they are held.

3. In an electric meter, an arm moved by the strength of the measured current hung upon a shaft, a brake-shoe located adjacent to said shaft, an armature-lever operatively connected with said brake-shoe, and an electro-magnet for causing said brake to bear upon said shaft, substantially as described.

In witness whereof I have hereunto signed my name in the presence of two subscribing witnesses.

EDWARD R. KNOWLES.

Witnesses:
WM. A. ROSENBAUM,
F. C. GRUEN.